United States Patent [19]

Hercher

[11] Patent Number: 4,823,348
[45] Date of Patent: Apr. 18, 1989

[54] LASER STABILIZATION DEVICE

[75] Inventor: Michael Hercher, Marblehead, Mass.

[73] Assignee: Optra, Inc., Peabody, Mass.

[21] Appl. No.: 235,834

[22] Filed: Aug. 18, 1988

Related U.S. Application Data

[63] Continuation of Ser. No. 870,190, Jun. 3, 1986, abandoned.

[51] Int. Cl.$^4$ ................................................ H01S 3/13
[52] U.S. Cl. ........................................ 372/32; 372/37; 372/20; 372/34
[58] Field of Search .................. 372/18, 373, 34, 30, 372/29, 26, 101, 94, 99

[56] References Cited

U.S. PATENT DOCUMENTS

| | | | |
|---|---|---|---|
| 4,232,274 | 11/1980 | Tokudome et al. | 372/61 |
| 4,293,223 | 10/1981 | Seaton | 372/98 |
| 4,387,462 | 6/1983 | Markus | 372/34 |
| 4,425,651 | 1/1984 | Popp et al. | 372/34 |
| 4,468,773 | 8/1984 | Seaton | 372/18 |
| 4,475,197 | 10/1984 | Tanton | 372/37 |
| 4,672,618 | 6/1987 | Wyntjes et al. | 372/34 |
| 4,779,279 | 10/1988 | Brown | 372/32 |

Primary Examiner—Léon Scott, Jr.
Attorney, Agent, or Firm—Gaston & Snow

[57] ABSTRACT

Frequency stabilization is disclosed for a laser device, wherein the laser tube is provided with end mirrors which are mounted in extensions at the respective ends of the laser tube. The laser tube extensions have reduced sections which are movable to allow adjustment of the end mirrors in the laser device. The reduced sections are preferably made of metallic material. The means to stabilize frequency provided is the application of heat or current or both to and around a reduced metallic section in the laser tube extension. This may be accomplished by the passing of current through a wire wrapped around the reduced metallic section. The passing of such current causes the reduced metallic section to contract and expand along an axis in line with the laser tube, and as well as a magnetic field is induced upon the gaseous medium within the laser tube. By such means controlled by suitable circuitry, laser frequency stabilization is accomplished. The means provided may be mounted on commercially available laser devices.

17 Claims, 1 Drawing Sheet ized by the apparatus of the present invention.

LASER STABILIZATION DEVICE

BACKGROUND OF THE INVENTION

This is a continuation of co-pending application Ser. No. 870,190 filed on June 3, 1986, abandoned.

This invention relates to the stabilization of the output of lasers of various types, and specifically to apparatus to quickly and accurately control the optical length of the laser over a wide range, and which apparatus is easily adapted to existing laser devices with simple modifications. Stabilization of a laser at a certain frequency (or frequencies if the laser is of the multiple-frequency type) is especially important in lasers used in metrology applications such as laser interferometers.

Prior art devices exist in which means are provided for the stabilization of the laser system, as for example in U.S. Pat. No. 3,793,595. The patent discloses an apparatus to modulate the length of the optical cavity by using a piezoelectric reciprocal motion actuating device upon which is mounted one of two mirrors oppositely opposed within the laser tube and which define therebetween the optical cavity length. The application of a voltage to the piezoelectric device moves the mirror a predetermined amount in either direction of translational motion to vary the optical length of the laser cavity.

The disadvantage of such structure is that the range of movement of the mirror is limited to small movements, thus being incapable of the larger movements which may be necessary for proper stabilized operation of the laser device. Further, the piezoelectric device adjustment means in the patent is mounted internally of the laser tube housing. This prevents or at least makes repair and adjustments of the device impractical. Such piezoelectric device also requires a relatively high voltage to move the device through a relatively small translational movement, or requires that the device employ multiple layer segmented piezoelectric elements, which may be complex and expensive devices.

The patent also discloses a coarse mirror adjustment means in the form of a mirror mounted on a block around which a heater coil is wrapped so that, upon heating, the block will expand to translate the mirror. This structure has the disadvantage in that the coil and the block upon which it is mounted are internal of the laser tube housing, making repair or adjustment impractical.

Further prior art apparatus for achieving the control of the optical cavity are through use of heaters attached to the laser tube as well as solenoidal coils disposed around the laser tube. An example of the heater is disclosed in U.S. Pat. No. 4,387,462, which discloses electrical heating elements disposed around the laser tube. This structure, while exterior of the laser tube generally requires a long response time due to the mass of the material which must be heated in order that the laser tube may expand.

With the use of a solenoid coil disposed around the laser tube, a magnetic field is produced which acts on the gaseous medium within the laser tube to change its refractive index and thus changes the optical (but not the physical) length of the laser tube. While this arrangement does not involve heating the laser tube, but rather uses a more rapidly responsive electromagnetic force to adjust the length of the optical path, nevertheless the range of accurate translational movement is limited.

SUMMARY OF THE INVENTION

Accordingly, it is an object of this invention to provide a new and improved laser stabilization apparatus for use with laser devices whereby the optical length of the laser tube is accurately and quickly controlled and adjusted over a moderately broad range of adjustments.

It is a further object of this invention to provide a laser stabilization apparatus which is easily adaptable to existing laser tubes without the necessity of extensive alterations to the laser tube.

It is a still further object of this invention to provide a laser stabilization apparatus which is contained externally of the laser tube housing and thus may be easily adjusted and repaired.

It is still another object of this invention to provide a laser stabilization apparatus which is inexpensive to manufacture and maintain, and which is adapted for use with a variety of laser tube types and configurations, including off-the-shelf, inexpensive and commercially available laser tubes, further including single and two-frequency lasers, such as those manufactured by the assignee of the present invention, Optra, Inc., of Peabody, Massachusetts.

These and other objects and features of the present invention will be better understood from the following detailed description which should be read in light of the accompanying drawing in which corresponding reference numerals refer to corresponding parts of the drawings.

DETAILED DESCRIPTION OF THE PREFERRED EMBODIMENT

Figure 1:
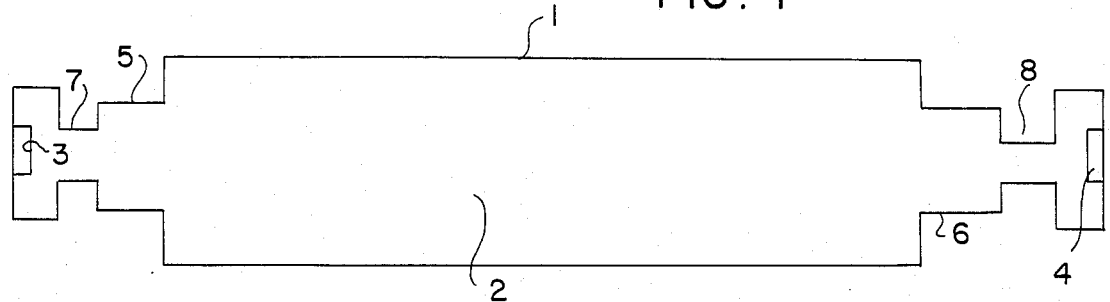
FIG. 1 is a generalized schematic and diagrammetric view of a conventional laser device in which the present invention is embodied.

Referring now to FIG. 1, there is illustrated a conventional laser tube structure upon which the subject of this invention is mounted. Such structure includes a laser tube generally noted at 1, which comprises a laser chamber denoted at 2, in which may be contained a gaseous mixture or medium such as a well-known helium/neon mixture or other medium. Other gaseous mixtures may be used without affecting the operation of the apparatus of the present invention. Two mirrors 3 and 4 are oppositely disposed in the end portions 5 and 6 respectively of the laser tube.

As is well known in the art, lasers are useful, among other purposes, for use in interferometric measurement wherein the precisely controlled and determinable length of the light wavelength in the laser is used as a standard against which measurements of various varieties are made.

A laser is useful for such measurements, but only if the laser light wavelength is itself stabilized at an established and predetermined value, which will be accomplished by the stabilization of the laser at a particular frequency. The following discussion with reference to the drawings discloses the requirements for stabilization as practiced heretofore and as disclosed by the invention herein.

In the laser device of FIG. 1, by known methods, the material in the laser chamber 2 is excited to a high energy state by an electrical discharge. The longitudinal dimension or length of the laser chamber 2, and more specifically the distance between the opposing mirrors 3 and 4 is constructed to be made equal to a whole number multiple of the electromagnetic wavelength generated within the laser chamber 2. According to well-known principles of laser devices, the laser output is of a wavelength (or wavelengths) such that an integral number of one-half wavelengths equal the optical length of the laser tube. For example, in a helium-neon laser, there are always one or two wavelengths which satisfy this condition, and which are called resonant wavelengths, and which also lie within the gain bandwidth of the laser.

As the optical length of the laser changes, due, for example, to thermal expansion, these resonant wavelengths move across the laser gain bandwidth, turning off when they approach a point where there is insufficient gain, and being replaced by new wavelengths which have moved into the gain curve. A laser can operate within a range of dimensions because it can always find a resonant wavelength at which to operate, but the exact value of that wavelength depends on the exact value of the optical length of the laser tube, that is, the distance between one mirror surface and the other of mirrors 3 and 4. In order to control the frequency and thus the optical length of the output of the laser, it may be necessary to provide for the adjustment of the optical distance between the two mirrors 3 and 4. This has been accomplished in prior art devices, as discussed above, by various means, all of which have certain advantages and disadvantages. The basic deficiency of the prior art devices is that the designer must choose between two criteria for the adjustment if the device is to be kept relatively simple in structure for the purposes of reliability.

One may choose an adjustment means which permits large adjustments, in the range of 0.0 to 0.5 mm., but is relatively slow to react, in the order of 0.1 to 1.0 seconds. An example of this type of adjustment means is the provision of a heating wire or other heating means disposed around the laser tube itself, which produces a lengthening or contraction of the laser tube, and thus the distance between the opposing mirrors, by the thermal expansion of the laser tube by the heat applied to it.

On the other hand, the designer may choose a relatively fast adjustment means in which reactions to needs to change and adjust for the stability are accomplished by the use of a piezoelectric element upon which is mounted one of the mirrors or by mounting the element on a movable diaphragm so that, in both instances, changes in the distance between the mirrors may be made by supplying a voltage signal to the piezoelectric element. The disadvantage of this type of device is that, while response is rapid, in the order of $10^{-5}$ to $10^{-3}$ seconds, the maximum length of possible extension and contraction is only 0.002 to 0.01 mm.

In other prior art devices, such as that disclosed in U.S. Pat. No. 3,793,595, a combination of both the piezoelectric and the heat expansion-type adjustment means is utilized.

The disadvantage of this combination is that while the combination of the two adjustment devices separately provides both quick and relatively large adjustments over a reasonable range, the device requires relatively complex circuitry to coordinate the two adjustment means to effectuate the adjustment required or desired. Further, the adjustment means disclosed in the patent is positioned within the laser tube itself and therefore is difficult to service or repair, and impossible to implement in off-the-shelf laser tubes.

By contrast, the present invention combines in a single element the desirable features of the prior art, with the provision of a relatively fast length adjustment over a relatively wide range of adjustment and accomplishes the foregoing with a simple means which may be additionally adapted for many types of existing laser devices. As will be described in detail below, in the device of the present invention, small (less than half wavelength) rapid corrections are accomplished by the solenoid device which forms part of the present invention, by AC correction by change in the refractive index of the gaseous medium in the laser tube, and slow (less than about 50 Hz) corrections are accomplished by the heater which forms a further part of this invention, using DC correction by change in the physical length of the laser tube.

As shown by FIG. 1, the laser device includes at the end portions 5 and 6 thereof the mirrors 3 and 4, respectively. Mirrors 3 and 4, as is well known in the art, are disposed oppositely to one another and at a distance to facilitate resonance of the electromagnetic waves generated within the laser tube. In usual practice, at least one of the mirrors is partially reflecting and partially transmitting to allow the transmission of the laser beam out of the laser tube and into the outside environment.

The mirrors must be precisely positioned with respect to the distance between them, as stated above, and must also be axially aligned with one another so that the electromagnetic beam is reflected between the mirrors' centers of curvature. To this end, the mirrors are usually in production mounted in end portions 5 and 6 which includes reduced sections or portions 7 and 8 disposed between the mirrors 3 or 4 and the main body of the laser tube 1 and which reduced sections or portions are made of a metallic material. One purpose of the inclusion of the reduced section 7 is to allow the operator to align the mirrors 3 and 4 either at the factory or otherwise in use. Because the portion 7 is made usually of metal (for reasons well known in the art), bending of the portion 7 may be made without causing the reduced section to break or shear from the laser tube.

In the preferred embodiment, the invention makes use of the reduced metal section 7 to allow for length adjustments between the mirrors 3 and 4, by utilizing the thermal expansion capabilities of the reduced metal section 7 when heated to expand along the optical axis defined by the mirrors 3 and 4. The reduced metal section is itself rather thin in thickness, in the range of 0.2 to 0.5 mm., and has disposed thereabout a means to heat the reduced section 7. The utility of having the heating means located where the metal thickness is thin is to apply the heat where the thermal mass of the heated segment is small, so that a given heat input will cause a relatively large immediate temperature increase and corresponding thermal expansion. This contrasts with the devices of the prior art in which the mass of the portion of the laser device being heated is comparatively large, thus making adjustments in these prior art devices slower relative to the invention of the present device.

Figure 2:
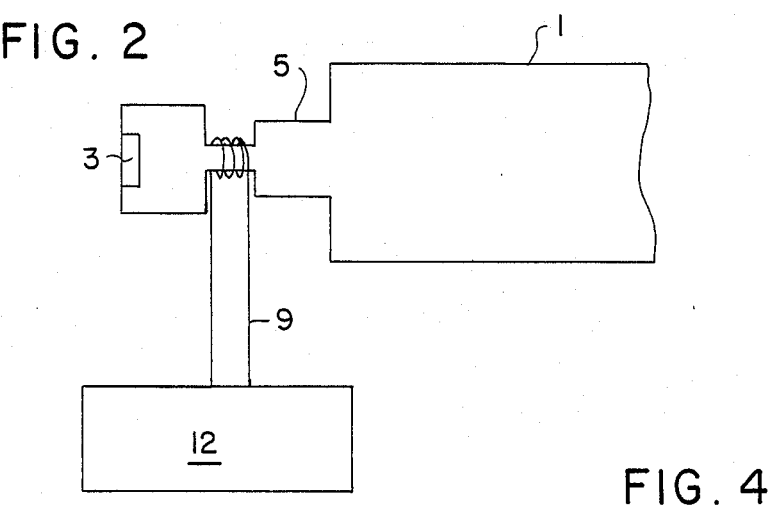
FIG. 2 is a partial side view of an end of the laser device of FIG. 1 with a first embodiment of the invention of the present application.
Figure 3:
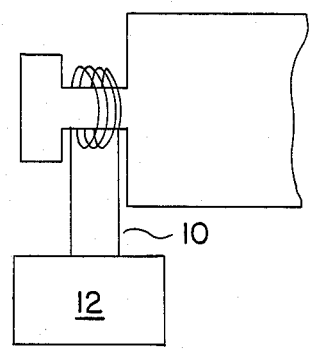
FIG. 3 is a partial side view of an end portion of the laser device of FIG. 1 with an additional embodiment of the invention of the present application.
Figure 4:
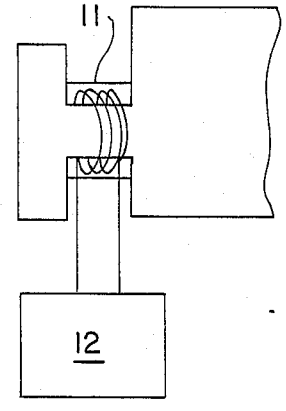
FIG. 4 is a view of the laser of FIG. 1 with a third embodiment of the invention of the present application.

In the embodiment shown, the reduced section 7 has wound thereabout a coil of heating wire 9, which may be insulated nichrome or a resistance wire with similar properties. In the embodiment shown in FIG. 2, the wire 9 is wound about the reduced section 7 in a singular direction. Because of the singular direction of the winding of the wire, a magnetic field will be induced upon the gaseous medium within the laser tube 2. While this might be desirable in certain instances, for example in order that the adjustment induced by the solenoidal action not be counteracted by the heater action because of opposite directions of adjustment upon heating of the wire 10, it may be undesirable in others, and therefore the second embodiment shown in FIG. 3 incorporates a wire 10 of a similar construction to wire 9 wound in two opposite directions of winding to eliminate the magnetic field, so that only the heater adjustment is operable under these circumstances. Additionally, the wires 9 or 10 as described and shown in FIGS. 2 and 3 may be embedded within a thermally-conducting material 11, as shown in FIG. 4 to improve heat transfer to the reduced metal sections of the laser tube 1, and to prevent the wires from reaching excessively high temperatures.

The heating wire or similar heating means as shown and described is connected to suitable circuitry to allow adjustment of the distance between the mirrors 3 and 4. Such circuitry is shown diagrammatically in FIG. 1 as 12 and may be any suitable circuitry known in the art which accomplishes the purpose of applying a current signal to the heating wires 9 or 10, whether encased in material 11 or not. A suitable control for controlling the optical length is the closed loop servo control disclosed and claimed in U.S. Pat. No. 4,672,618, entitled Laser Stabilization Servo System, filed Mar. 15, 1983 and assigned to the same assignee of the present invention.

An advantage of the present invention is that the adjustment means as shown and described is simple in construction, and thus less expensive to manufacture, may be retrofitted on existing laser devices with little modifications, and, because of its being mounted outside the laser tube, may be easily repaired and adjusted.

The invention disclosed herein has the advantages of the adjusting systems currently in use, while maintaining simplicity of operation and being less expensive in cost. The invention allows relatively fast adjustments in length as is performed currently with solenoid-controlled or piezoelectric devices as well as relatively large range of adjustments as is presently performed by present expansion heating devices.

In operation, the dynamic range of the adjustment means shown and described is in the range of 0.0 to 0.05 mm., and the response time is between $10^{-4}$ and $10^{-3}$ seconds. This compares favorably with current adjustment means utilized. Utilizing the present invention alone, the laser device is usually stabilized within a period of five minutes from initial excitation of the laser device.

It is intended within the scope of the invention that the device of the present invention may be utilized in single as well as two-frequency laser devices.

While the foregoing invention has been described with reference to its preferred embodiments, various modifications and alterations will occur to those skilled in the art, and these are intended to fall within the scope of the appended claims.

What is claimed is:

1. A frequency stabilized laser comprising:
    an elongated laser tube having two ends, said laser tube having contained therein a gaseous medium, at least two oppositely disposed and facing mirrors within said laser tube, means to excite said medium in said laser tube so as to cause resonance of electromagnetic energy therein;
    said at least two mirrors being disposed a distance apart, said distance corresponding to a multiple of the wavelength of said electromagnetic energy resonating in said laser tube when excited by said means to excite, thereby defining the optical and physical length of said laser tue;
    at least one of said ends having an elongated extension extending from said at least one end and generally in the direction of elongation of said laser tube;
    at least one of said mirrors being disposed and fixed within said elongated extension;
    said elongated extension having a reduced section disposed between said at least one of said mirrors and said at least one of said ends;
    means for adjusting at least one of the said optical or the said physical length of said laser tube, said adjustment means being applied to said reduced section of said elongated extension.

2. The frequency stabilized laser device of claim 1 wherein the said adjustment means applied to said reduced section of said elongated extension adjusts both the said optical and the said physical length of said laser tube.

3. The frequency stabilized laser device of claim 1 wherein the means for adjusting the said physical length of said laser tube comprises means for applying heat to said reduced section of said at least one elongated extension such that upon heating said extension is caused to extend in a direction generally in the direction of elongation of said laser tube, thereby causing movement of said at least one mirror and a change in said distance between said at least two mirrors.

4. The frequency stabilized laser device of claim 3 wherein at least a portion of said reduced section of said elongated extension is composed of a metallic material and wherein said means for applying heat is applied to heat said metallic material.

5. The frequency stabilized laser device of claim 1 wherein the means for adjusting the said optical length of said laser tube comprises means for applying a solenoidal magnetic field induction to said reduced section of said elongated extension.

6. The frequency stabilized laser device of claim 1 wherein the said means for adjusting comprises a single directionally wound resistance wire wound around said reduced section of said elongated extension and adapted for the reception of an electric current passing through said wire.

7. The frequency stabilized laser device of claim 1 wherein the said means for adjusting comprises a single directionally wound resistance wire wound around said reduced section of said elongated extension, said wire being adapted for heating of said elongated extension by an electric current passing through said wire.

8. The frequency stabilized laser device of claim 1 wherein the said means for adjusting comprises a single directionally wound resistance wire wound around said reduced section of said elongated extension, said wire being adapted for inducing a solenoidal magnetic field on said medium in said laser tube by an electric current passing through said wire.

9. The frequency stabilized laser device of claim 1 wherein the said means for adjusting comprises a single directionally wound resistance wire wound around said reduced section of said elongated extension, said wire being adapted for heating of said elongated extension and for inducing a solenoidal magnetic field on said medium in said laser tube by an electric current passing through said wire.

10. The frequency stabilized laser device of claim 7, further comprising a thermally conducting material disposed about at least a portion of said wire, whereby heat transfer from said wire to said reduced section of said elongated extension is uniformly distributed by said thermally conducting material.

11. The frequency stabilized laser device of claim 1 wherein the said means for adjusting comprises a resistance wire wound in opposite directions around said reduced section of said elongated extension and adapted for the reception of an electric current passing through said wire.

12. The frequency stabilized laser device of claim 1 wherein the said means for adjusting comprises a resistance wire wound in opposite directions around said reduced section of said elongated extension, said wire being adapted for heating of said elongated extension by an electric current passing through said wire.

13. The frequency stabilized laser device of claim 12, further comprising a thermally conducting material disposed about at least a portion of said wire, whereby heat transfer from said wire to said reduced section of said elongated extension is uniformly distributed by said thermally conducting material.

14. An attached for a laser device to stabilize the operation of a laser, and in which the laser device comprises a laser tube extending in a longitudinal direction, said laser tube having on at least one end thereof a portion extending in said longitudinal direction and containing therein a mirror, said extending portion having a reduced section, said reduced section being disposed between said at least one end and said mirror, said attachment comprising means for heating said reduced section of said extending portion wherein, upon heating said reduced section of said extending portion will extend in said longitudinal direction.

15. The attachment for a laser device as claimed in claim 14, in which said means for heating comprises a resistance wire disposed around said extending portion and adapted to be heated by an electric current passing through said wire.

16. An attachment for a laser device to stabilize the operation of a laser, and in which the laser device comprises a laser tube extending in a longitudinal direction, said laser tue having on at least one end thereof a portion extending in said longitudinal direction and containing therein a mirror, said extending portion having a reduced section, said reduced section being disposed between said at least one end and said mirror, said attachment comprising means for applying a solenoidal magnetic field induction to said reduced section of said extending portion.

17. The attachment for a laser device as claimed in claim 16, in which said means for applying a solenoidal-magnetic field induction comprises a resistance wire disposed around said reduced section of said extending portion and adapted to be heated by an electric current passing through said wire.

* * * * *